(12) United States Patent
Hoffman et al.

(10) Patent No.: US 11,814,186 B2
(45) Date of Patent: Nov. 14, 2023

(54) FLOW APERTURE METHOD AND APPARATUS

(71) Applicant: General Electric Company, Schenectady, NY (US)

(72) Inventors: James Michael Hoffman, Franklin, OH (US); Michael G. Chenery, Loveland, OH (US); David A. Perveiler, West Chester, OH (US); Dennis R. Jonassen, Liberty Township, OH (US); Scott Alan Schimmels, Miamisburg, OH (US)

(73) Assignee: General Electric Company, Schenectady, NY (US)

( * ) Notice: Subject to any disclaimer, the term of this patent is extended or adjusted under 35 U.S.C. 154(b) by 37 days.

(21) Appl. No.: 17/545,949

(22) Filed: Dec. 8, 2021

(65) Prior Publication Data

US 2023/0174246 A1 Jun. 8, 2023

(51) Int. Cl.
| | |
|---|---|
| *B64D 33/04* | (2006.01) |
| *F01D 25/12* | (2006.01) |
| *F02C 9/18* | (2006.01) |
| *F02C 7/14* | (2006.01) |
| *B64D 27/18* | (2006.01) |
| *F02C 7/141* | (2006.01) |
| *F01L 25/08* | (2006.01) |
| *B64D 33/02* | (2006.01) |

(52) U.S. Cl.
CPC .............. *B64D 33/04* (2013.01); *B64D 27/18* (2013.01); *F01L 25/08* (2013.01); *F02C 7/141* (2013.01); *F02C 9/18* (2013.01); *B64D 2033/026* (2013.01)

(58) Field of Classification Search
CPC .... B64D 33/04; B64D 27/18; B64D 2033/26; F01D 25/08; F01D 25/12; F02C 9/16; F02C 9/18; F02C 7/12; F02C 7/125; F02C 7/14; F02C 7/141; F02C 7/143
See application file for complete search history.

(56) References Cited

U.S. PATENT DOCUMENTS

| | | |
|---|---|---|
| 5,316,437 A | 5/1994 | Hare |
| 6,163,959 A | 12/2000 | Arraitz |
| 7,396,203 B2 | 7/2008 | Martindale |
| 8,096,105 B2 | 1/2012 | Porte |
| 8,601,788 B2 | 12/2013 | Crosta |
| 8,991,191 B2 | 3/2015 | Diaz |

(Continued)

FOREIGN PATENT DOCUMENTS

| | | |
|---|---|---|
| EP | 2333288 | 6/2011 |
| EP | 3321181 | 5/2018 |

*Primary Examiner* — Jacob M Amick
(74) *Attorney, Agent, or Firm* — Fitch, Even, Tabin & Flannery, LLP

(57) ABSTRACT

In a jet engine having a core that sources a first flow of fluid and a component (such as a fan, a pump, and/or a bleed line) that sources a second flow of fluid, and where the first flow of fluid will typically have, at least during ordinary operation, a higher temperature than the second flow of fluid, at least one flow aperture formed by a first passageway to receive at least a portion of the aforementioned second flow of fluid, wherein that first passageway is comprised of at least one material that (by design and intent) deflects as a function of temperature such that a flow of the second flow of fluid through the at least one flow aperture is thereby desirably modulated.

19 Claims, 3 Drawing Sheets

(56) References Cited

U.S. PATENT DOCUMENTS

| | | |
|---|---|---|
| 10,427,632 B2 | 10/2019 | Jackowski |
| 2007/0171609 A1* | 7/2007 | Kehl .................. H05K 7/20181 361/690 |
| 2007/0186535 A1* | 8/2007 | Powell .................... F02K 3/072 60/263 |
| 2021/0017881 A1 | 1/2021 | Diaz |

* cited by examiner

FLOW APERTURE METHOD AND APPARATUS

TECHNICAL FIELD

These teachings relate generally to jet engines and more particularly to corresponding flow apertures.

BACKGROUND

Thermal control can comprise an important part of jet engine design and operation. Examples in these regards include, but are not limited to, cooling modulation, fan flow injection to the core, and fan back pressure. A typical prior art approach to thermal control often includes, at least in part, the use of mechanical actuators (where a mechanical actuator is understand to comprise a mechanical system that executes movement by converting one kind of motion, such as a linear or rotary motion, into another kind of motion). For example, a typical variable area bypass injector (VABI) can vary conductivity between a fan and a core passage using a mechanically actuated system.

BRIEF DESCRIPTION OF THE DRAWINGS

The above needs are at least partially met through provision of the flow aperture method and apparatus described in the following detailed description, particularly when studied in conjunction with the drawings. A full and enabling disclosure of the aspects of the present description, including the best mode thereof, directed to one of ordinary skill in the art, is set forth in the specification, which refers to the appended figures, in which.

Figure 1:
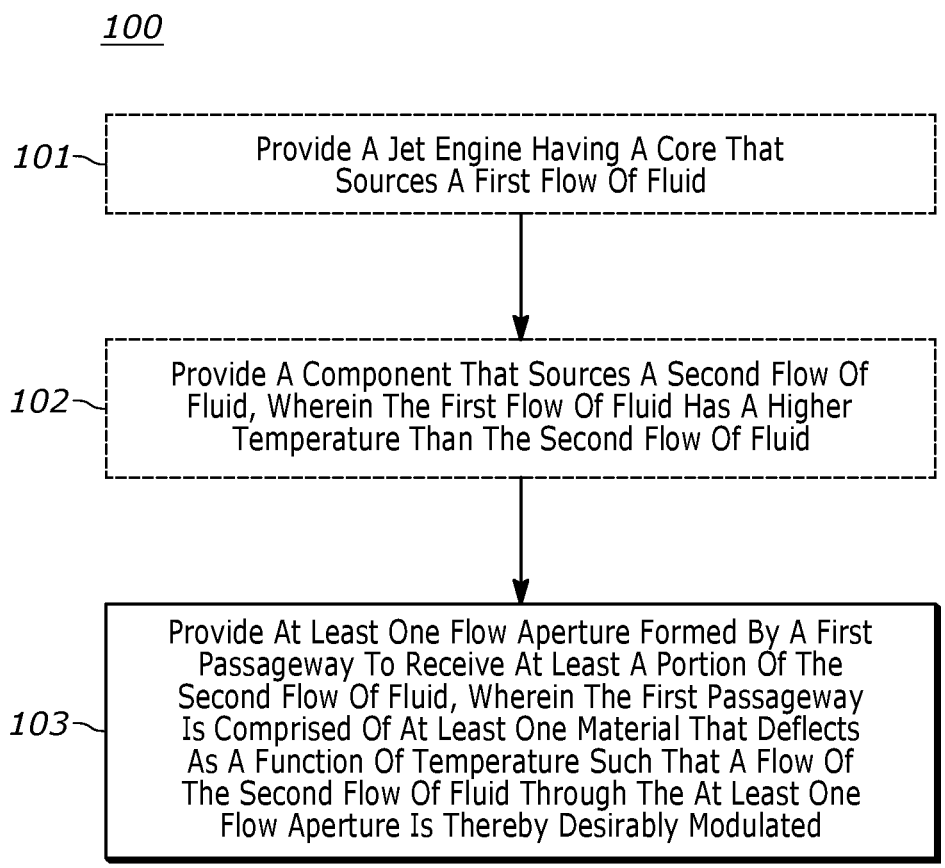
FIG. 1 comprises a flow diagram as configured in accordance with various embodiments of these teachings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required.

DETAILED DESCRIPTION

Conventional thermal control approaches are often relatively heavy and may also require a considerable amount of space. Corresponding maintenance requirements may also be of concern. These are all significant challenges in the context of aviation application settings.

Generally speaking, the various aspects of the present disclosure can be employed with a jet engine having a core that sources a first flow of fluid and a module or component (such as a fan, a pump, and/or a bleed line) that sources a second flow of fluid. The first flow of fluid will typically have, at least during ordinary operation, a higher temperature than the second flow of fluid. These teachings generally provide for at least one flow aperture formed by a first passageway to receive at least a portion of the aforementioned second flow of fluid, wherein that first passageway is comprised of at least one material that (by design and intent) deflects as a function of a given thermal-based characteristic, such as temperature, such that a flow of the second flow of fluid through the at least one flow aperture is thereby desirably modulated.

These teachings are flexible in practice. As one example, the aforementioned flow aperture may comprise at least one of a slot, a hole, a plate orifice, a pipe, and/or a variable area bypass injector. As a more specific example, the flow aperture may comprise a fan-to-core slot formed in a given material. As another example, the flow aperture may comprise a plurality of cascaded flow apertures.

The aforementioned material that comprises the first passageway may comprise a high temperature alloy that maintains physical integrity up to at least 1400° F. If desired, that material may comprise a metal having a high coefficient of thermal expansion. By one approach, that material includes a bimetallic component.

If desired, the aforementioned flow aperture may comprise a flow dam operably coupled to the first passageway, such that a flow gap formed by the flow dam is controlled by deflection of the material as a function of temperature. Also, if desired, the flow aperture may further comprise a thermal barrier coating disposed to thermally isolate the first passageway such that deflection of the material that is adjacent to the first flow of fluid accurately tracks a temperature of the first flow of fluid.

So configured, the flow aperture establishes an area that is controlled via intentional thermal deflection of the components that comprise and form, at least in part, the aperture. As one example, the flow aperture may comprise a fan-to-core slot or cascade of slots that may be actively cooled or heated via impinging air or fuel in a return-to-tank configuration. Alternatively, such a slot in a configuration aft of an augmenter may be passively controlled such that an increasing temperature will result in increasing closure of the slot (at least up to some maximum point).

So configured, any of a variety of desirable thermal control activities, including modulated cooling, fan flow injection to the core, and/or fan back pressure, can be partially or wholly effected without the use of mechanical actuators. Corresponding weight and space savings can be considerable depending upon the application setting.

The terms and expressions used herein have the ordinary technical meaning as is accorded to such terms and expressions by persons skilled in the technical field as set forth above except where different specific meanings have otherwise been set forth herein. The word "or" when used herein shall be interpreted as having a disjunctive construction rather than a conjunctive construction unless otherwise specifically indicated. The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

These and other benefits may become clearer upon making a thorough review and study of the following detailed description. Referring now to the drawings, and in particular to both FIG. 1 and FIG. 2, an illustrative process 100 that is compatible with many of these teachings will now be presented.

Optional block 101 of this process 100 provides a jet engine 200 having a core 201 that sources a first flow of fluid 202. Optional block 102 provides a component 203 that sources a second flow of fluid 204. In this illustrative example, the first flow of fluid 202 has a higher temperature than the second flow of fluid 204. In a typical application setting the first flow of fluid 202 may be warmer by more than one or two orders of magnitude. These teachings will accommodate a variety of different kinds of components 203. Examples include, but are not limited to, a fan, a pump, and a bleed line.

Various jet engine designs are known in the art. As these teachings are not overly sensitive to any particular choices in these regards, further elaboration in these particular regards is not provided here for the sake of brevity. It will also be noted that the first flow of fluid 202 and/or the second flow of fluid 204 may be a gas or a liquid.

At block 103 this process 100 provides (in the jet engine 200) at least one flow aperture 205 formed by a first passageway and configured to receive at least a portion of the second flow of fluid 204. Generally speaking, this first passageway is comprised of at least one material that deflects as a function of temperature such that the second flow of fluid 204 through the at least one flow aperture 205 is thereby desirably modulated.

Generally speaking, the flow aperture 205 may comprise one or more of a slot, a hole, a plate orifice, a pipe, and/or a variable area bypass injector. (It will be understood that as used herein, the aforementioned words "slot" and "hole" are interpreted to include both a substrate material and an absence of such material that defines the corresponding cavity (i.e., the slot/hole) in that material. As a more specific example, the flow aperture 205 may comprise a fan-to-core slot as is known in the art.

Figure 2:
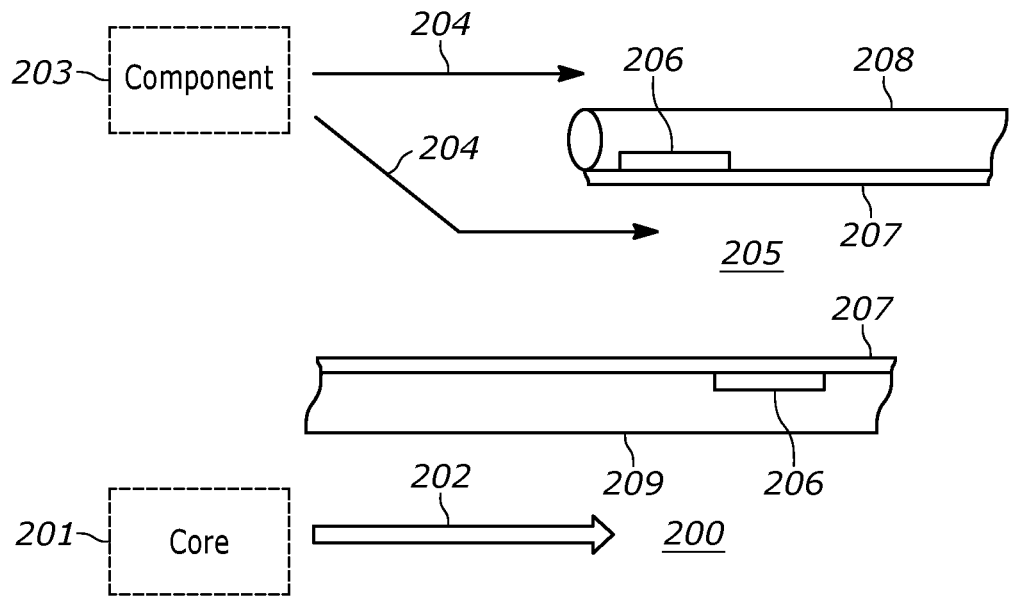
FIG. 2 comprises a schematic view as configured in accordance with various embodiments of these teachings.

By one approach, the aforementioned deflecting material may comprise a single material such as a high temperature alloy that maintains physical integrity up to at least 1400° F. As shown in the illustrative example shown in FIG. 2, the aforementioned passageway can be formed, at least in part, by both a first portion 208 and a second portion 209. Both portions 208 and 209 may be comprised of (a same or different) material that expands with increasing temperature. More particularly, in this example the first portion 208 may be comprised of material that will expand more at a given temperature than the material that comprises the second portion 209. If desired, and also as shown in FIG. 2, one or both of these portions 208 and 209 may have metal strips 207 attached thereto, which metal strips 207 have a relatively high coefficient of thermal expansion to thereby enhance the desired behavior. (Those skilled in the art will know that the coefficient of thermal expansion represents the relative expansion of a given material divided by a corresponding change in temperature.)

By one approach, in lieu of the foregoing or in combination there with, and also as illustrated, the deflecting material may include one or more bimetallic components 206. Those skilled in the art will know that bimetallic components serve to convert a temperature change into a corresponding (and predictable) mechanical displacement. Such components often consist of two strips of different metals that expand at different rates as they are heated. These different rates of expansion force the component to bend one way if heated, and in the opposite direction if cooled below its initial temperature. The metal with the higher coefficient of thermal expansion is typically on the outer side of the curve when the strip is heated and on the inner side when cooled.

With continued reference to FIG. 2, the cross-sectional area of the flow aperture 205 will vary as a function of the differential between the temperature of the first flow of fluid 202 from the core 201 and the temperature of the second flow of fluid 204 from the component 203. This controlled variation of the size of the flow aperture 205, in turn, can serve to desirably modulate the flow of the second flow of fluid 204 through that aperture 205.

Figure 4:
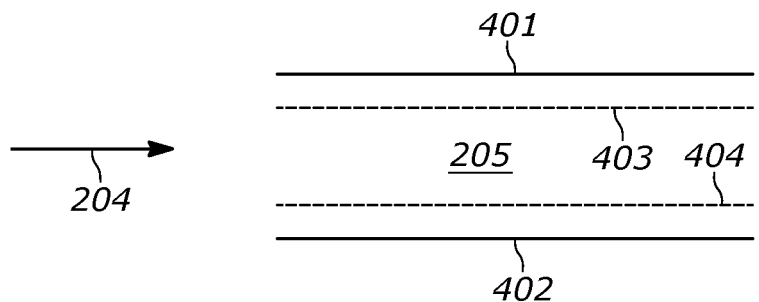
FIG. 4 comprises a schematic view as configured in accordance with various embodiments of these teachings.
Figure 5:
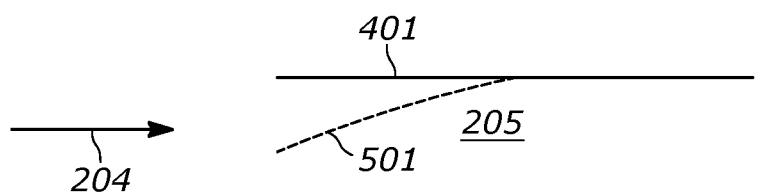
FIG. 5 comprises a schematic view as configured in accordance with various embodiments of these teachings.

FIGS. 4 and 5 provide some illustrative examples in the foregoing regards. In FIG. 4, the aforementioned deflecting material is depicted in solid lines in an undeflected state as denoted by reference numerals 401 and 402. The deflecting materials 401 and 402 may be the same as, or different from, each other as desired. And as described above, each such deflecting material 401 and 402 may comprise a single material or may comprise a composite material (or even include one or more bimetallic components). In FIG. 4, these deflecting materials 401 and 402 have each, as a function of the corresponding temperatures, deflected inwardly to the flow aperture 205 to the positions presented in dashed lines and denoted by reference numerals 403 and 404, respectively. So deflected, it can be seen that the cross-sectional area of the flow aperture 205 has been reduced. While the deflection has been shown as linear it will be understood that the deflection may occur in any suitable manner including that the deflection may cause a reduced flow aperture only along a portion of the flow path.

FIG. 5 presents a different approach where at least one of the deflecting materials 401 arcs inwardly to the flow aperture 205 as a function of temperature and as depicted by the dashed line that is denoted by reference numeral 501.

Other deflection patterns are possible. Accordingly, the details of the foregoing examples will be understood to serve an illustrative purpose and those details are not intended to suggest any limitations with respect to these teachings.

Figure 3:
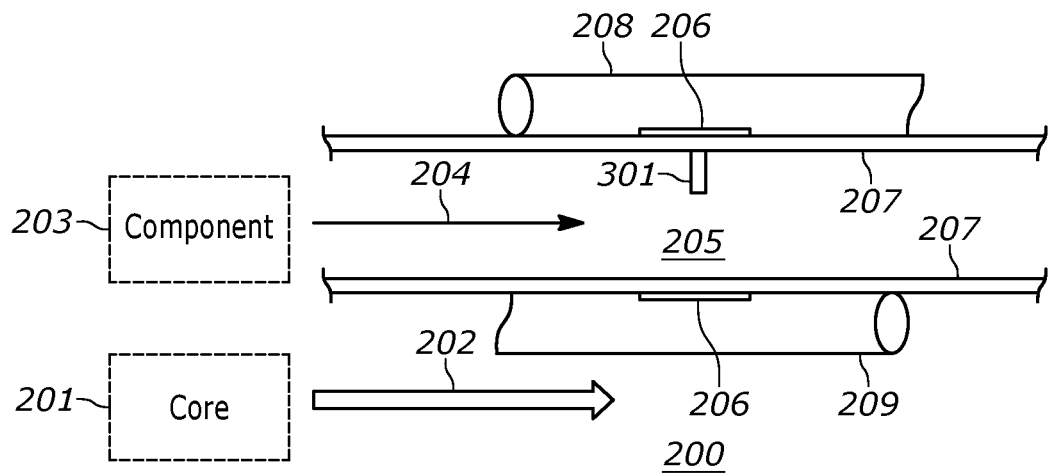
FIG. 3 comprises a schematic view as configured in accordance with various embodiments of these teachings.

These teachings are both practical and flexible in practice and will accommodate a variety of application settings. Referring now to FIG. 3, this figure provides one specific example in these regards. In this particular example, the first passageway that comprises the flow aperture 205 also includes a flow dam 301 operably coupled thereto. This flow dam 301 may comprise, for example, a metallic extension that protrudes into the passageway without fully obstructing that passageway (at least at lower temperatures). In this example this flow dam 301 is positioned in proximity to (indeed, opposite from) the bimetallic components 206 that are also provided. So configured, the flow gap formed at least in part by the flow dam 301 is selectively controlled by deflection of the deflecting material as a function of the corresponding temperatures of the various flows 202 and 204.

By one approach, again in lieu of the foregoing or in combination therewith, the flow aperture 205 may further comprise a thermal barrier coating disposed on part or all of its surfaces to further thermally isolate that corresponding first passageway such that deflection of the at least one material that is adjacent to the first flow of fluid 202 accurately tracks a temperature thereof. A variety of thermal barrier coatings are known in the art and comprise advanced materials that are applied, for example, to metallic surfaces operating at elevated temperatures, such as gas turbine or aero-engine parts, as a form of exhaust heat management. Such coatings (often ranging from 100 μm to 2 mm in thickness) typically serve to insulate components from large and prolonged heat loads and can sustain an appreciable temperature difference between the load-bearing alloys and the coating surface. As the present teachings are not overly sensitive to any particular selections in these regards, further elaboration regarding these materials is not provided here for the sake of brevity.

As one example in the foregoing regards, the flow aperture 205 comprises a fan-to-core slot (or cascade of slots) that is actively cooled or heated via impingement of air (or fuel in a return-to-tank configuration). As another example, the flow aperture 205 may comprise a slot in a VABI configuration positioned aft of an augmenter that may be passively controlled such that an increasing operating temperature will close the VABI slot.

The amount of control available via these teachings will vary with such things as the overall cross-sectional area of the flow aperture 205 and the deflection material(s) itself. Generally speaking, for at least most application settings these teachings would not be applied to completely close the flow aperture, but would serve instead to limit the cross-sectional size of that flow aperture. As one illustrative example in these regards, an entitlement area change of approximately 5 square inches may be achieved for a titanium component on an engine with a core diameter of the flow aperture 205 of 36 inches. This differential range may increase up to 10 or 15 square inches for an HS-188 component (referring to the side of the passage that is heated/cooled).

Figure 6:
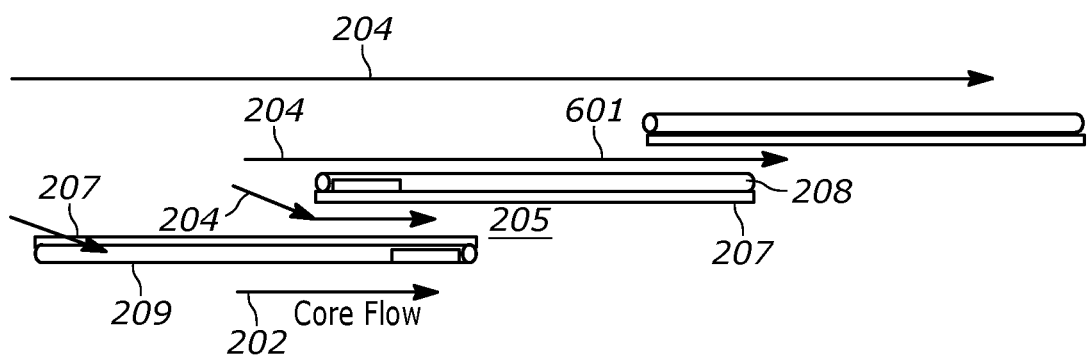
FIG. 6 comprises a schematic view as configured in accordance with various embodiments of these teachings.

A cascade of multiple thermally-controlled slots that apply this technique to both the inner and outer walls of a flow passage, and/or the use of bi-metallics, could further increase the amount of area control available via these teachings. FIG. 6 provides an illustrative example in these regards, where a second flow aperture 601 follows a first flow aperture 205.

So configured, these teachings can provide for thermally-controlled opening sizes via intentional heating or cooling of one or more walls. Temperature changes may be actively controlled via any of a variety of fluidic flows such as bleed air, fuel/hot fuels, and/or may be passively controlled and simply dependent upon the engine cycle. Generally speaking, these teachings permit passively controlled cooling, and flow injection to the core, and/or fan back pressure without the use of mechanical actuators, thus permitting savings with respect to weight, volume, cost, and/or maintenance requirements.

Further aspects of the invention are provided by the subject matter of the following clauses:

1. A jet engine having a core that sources a first flow of fluid and a component that sources a second flow of fluid, wherein the first flow of fluid has a higher temperature than the second flow of fluid, the jet engine further comprising: at least one flow aperture formed by a first passageway to receive at least a portion of the second flow of fluid, wherein the first passageway is comprised of at least one material that deflects as a function of temperature such that a flow of the second flow of fluid through the at least one flow aperture is thereby desirably modulated.
2. The jet engine of any preceding clause wherein the component that sources the second flow of fluid comprises at least one of: a fan; a pump; a bleed line.
3. The jet engine of any preceding clause wherein the at least one flow aperture comprises at least one of: a slot; a hole; a plate orifice; a pipe; and a variable area bypass injector.
4. The jet engine of any preceding clause wherein the at least one flow aperture comprises a fan-to-core slot.
5. The jet engine of any preceding clause wherein the at least one flow aperture comprises a plurality of cascaded flow apertures.
6. The jet engine of any preceding clause wherein the at least one material comprises a high temperature alloy that maintains physical integrity up to at least 1,400 degree Fahrenheit.
7. The jet engine of any preceding clause wherein the at least one material comprises a metal having a high coefficient of thermal expansion.
8. The jet engine of any preceding clause wherein the at least one material includes a bimetallic component.
9. The jet engine of any preceding clause wherein the at least one flow aperture further comprises a flow dam operably coupled to the first passageway, such that a flow gap formed by the flow dam is controlled by deflection of the at least one material as a function of the temperature.
10. The jet engine of any preceding clause wherein the at least one flow aperture further comprises a thermal barrier coating disposed to thermally isolate the first passageway such that deflection of the at least one material that is adjacent to the first flow of fluid accurately tracks a temperature of the first flow of fluid.
11. A method for use with a jet engine having a core that sources a first flow of fluid and a component that sources a second flow of fluid, wherein the first flow of fluid has a higher temperature than the second flow of fluid, the method comprising:

providing at least one flow aperture formed by a first passageway to receive at least a portion of the second flow of fluid, wherein the first passageway is comprised of at least one material that deflects as a function of temperature such that a flow of the second flow of fluid through the at least one flow aperture is thereby desirably modulated.

12. The method of any preceding clause wherein the component that sources the second flow of fluid comprises at least one of: a fan; a pump; a bleed line.
13. The method of any preceding clause wherein the at least one flow aperture comprises at least one of: a slot; a hole; a plate orifice; a pipe; and a variable area bypass injector.
14. The method of any preceding clause wherein the at least one flow aperture comprises a fan-to-core slot.
15. The method of any preceding clause wherein the at least one flow aperture comprises a plurality of cascaded flow apertures.

16. The method of any preceding clause wherein the at least one material comprises a high temperature alloy that maintains physical integrity up to at least 1,400 degree Fahrenheit.

17. The method of any preceding clause wherein the at least one material comprises a metal having a high coefficient of thermal expansion.

18. The method of any preceding clause wherein the at least one material includes a bimetallic component.

19. The method of any preceding clause wherein the at least one flow aperture further comprises a flow dam operably coupled to the first passageway, such that a flow gap formed by the flow dam is controlled by deflection of the at least one material as a function of the temperature.

20. The method of any preceding clause wherein the at least one flow aperture further comprises a thermal barrier coating disposed to thermally isolate the first passageway such that deflection of the at least one material that is adjacent to the first flow of fluid accurately tracks a temperature of the first flow of fluid.

Those skilled in the art will recognize that a wide variety of modifications, alterations, and combinations can be made with respect to the above-described embodiments without departing from the scope of the invention, and that such modifications, alterations, and combinations are to be viewed as being within the ambit of the inventive concept.

What is claimed is:

1. A jet engine having a core that sources a first flow of fluid and a component that sources a second flow of fluid, wherein the first flow of fluid has a higher temperature than the second flow of fluid, the jet engine further comprising:
at least one flow aperture formed by a first passageway to receive at least a portion of the second flow of fluid, wherein the first passageway is comprised of at least one material that deflects as a function of temperature such that a flow of the second flow of fluid through the at least one flow aperture is thereby desirably modulated;
wherein the at least one flow aperture further comprises a thermal barrier coating disposed to thermally isolate the first passageway such that deflection of the at least one material that deflects as a function of temperature that is adjacent to the first flow of fluid accurately tracks a temperature of the first flow of fluid.

2. The jet engine of claim 1 wherein the component that sources the second flow of fluid comprises at least one of:
a fan;
a pump; or
a bleed line.

3. The jet engine of claim 1 wherein the at least one flow aperture comprises at least one of:
a slot;
a hole;
a plate orifice;
a pipe; or
a variable area bypass injector.

4. The jet engine of claim 1 wherein the at least one flow aperture comprises a fan-to-core slot.

5. The jet engine of claim 1 wherein the at least one flow aperture comprises a plurality of cascaded flow apertures.

6. The jet engine of claim 1 wherein the at least one material that deflects as a function of temperature comprises a high temperature alloy that maintains physical integrity up to at least 1,400 degree Fahrenheit.

7. A jet engine having a core that sources a first flow of fluid and a component that sources a second flow of fluid, wherein the first flow of fluid has a higher temperature than the second flow of fluid, the jet engine further comprising:
at least one flow aperture formed by a first passageway to receive at least a portion of the second flow of fluid, wherein the first passageway is comprised of at least one material that deflects as a function of temperature such that a flow of the second flow of fluid through the at least one flow aperture is thereby desirably modulated;
wherein the at least one material that deflects as a function of temperature comprises a metal having a high coefficient of thermal expansion and wherein the at least one material that deflects as a function of temperature includes a bimetallic component.

8. The jet engine of claim 1 wherein the at least one flow aperture further comprises a flow dam operably coupled to the first passageway, such that a flow gap formed by the flow dam is controlled by deflection of the at least one material that deflects as a function of the temperature.

9. A method for use with a jet engine having a core that sources a first fluidic flow and a module that sources a second fluidic flow, wherein the first fluidic flow has a higher thermal-based characteristic than the second fluidic flow, the method comprising:
providing at least one flow opening formed by a first passageway to receive at least a portion of the second fluidic flow, wherein the first passageway is comprised of at least one material that deflects as a function of a thermal-based characteristic such that a flow of the second fluidic flowthrough the at least one flow opening is thereby desirably modulated;
wherein:
the at least one material that deflects as a function of a thermal-based characteristic comprises a metal having a high coefficient of thermal expansion; or
the at least one flow opening further comprises a thermal barrier coating disposed to thermally isolate the first passageway such that deflection of the at least one material that deflects as a function of a thermal-based characteristic that is adjacent to the first flow of fluid accurately tracks a temperature of the first flow of fluid.

10. The method for use with a jet engine of claim 9 wherein the module that sources the second fluidic flow comprises at least one of:
a fan;
a pump; or
a bleed line.

11. The method for use with a jet engine of claim 9 wherein the at least one flow opening comprises at least one of:
a slot;
a hole;
a plate orifice;
a pipe; or
a variable area bypass injector.

12. The method for use with a jet engine of claim 9 wherein the at least one flow opening comprises a fan-to-core slot.

13. The method for use with a jet engine of claim 9 wherein the at least one flow opening comprises a plurality of cascaded flow apertures.

14. The method for use with a jet engine of claim 9 wherein the at least one material that deflects as a function of a thermal-based characteristic comprises a high temperature alloy that maintains physical integrity up to at least 1,400 degree Fahrenheit.

15. The method for use with a jet engine of claim 9 wherein the at least one flow opening further comprises a flow dam operably coupled to the first passageway, such that a flow gap formed by the flow dam is controlled by deflection of the at least one material that deflects as a function of the thermal-based characteristic.

16. The jet engine of claim 1 wherein the first flow of fluid is warmer than the second flow of fluid by at least one order of magnitude.

17. The method of claim 9 wherein the first fluidic flow is warmer than the second fluidic flow by at least one order of magnitude.

18. The jet engine of claim 1 wherein the first flow of fluid comprises a flow of a gas and the second flow of fluid comprises a flow of a gas.

19. The method of claim 9 wherein the first fluidic flow comprises a flow of a gas and the second fluidic flow comprises a flow of a gas.

* * * * *